United States Patent

Kotani et al.

[11] Patent Number: 6,078,041
[45] Date of Patent: Jun. 20, 2000

[54] INTEGRATING CYLINDRICAL PIXEL DENSITY DETECTOR

[75] Inventors: Haruo Kotani, Takatsuki; Masakazu Karita, Yono, both of Japan

[73] Assignee: Nishimoto Sangyo Co., Ltd., Osaka, Japan

[21] Appl. No.: 08/952,111

[22] PCT Filed: Apr. 22, 1997

[86] PCT No.: PCT/JP97/01388

§ 371 Date: Nov. 24, 1997

§ 102(e) Date: Nov. 24, 1997

[87] PCT Pub. No.: WO97/40353

PCT Pub. Date: Oct. 30, 1997

[30] Foreign Application Priority Data

Apr. 25, 1996 [JP] Japan .................................. 8-131041

[51] Int. Cl.⁷ ...................................................... G01J 1/42
[52] U.S. Cl. ............................ 250/228; 250/586; 356/236
[58] Field of Search ........................... 250/228, 234–236, 250/586, 227.11; 356/236; 359/599

[56] References Cited

U.S. PATENT DOCUMENTS

| | | |
|---|---|---|
| 4,321,630 | 3/1982 | Kramer . |
| 4,629,890 | 12/1986 | Goto et al. ............................... 250/586 |
| 5,190,163 | 3/1993 | Anzai et al. ............................. 250/228 |
| 5,241,459 | 8/1993 | Kaplan et al. ........................... 250/228 |
| 5,332,904 | 7/1994 | Cannon .................................... 250/228 |
| 5,598,008 | 1/1997 | Livoni ..................................... 250/586 |
| 5,650,843 | 7/1997 | Moberg et al. .......................... 356/236 |

FOREIGN PATENT DOCUMENTS

| | | |
|---|---|---|
| 2653230 | 7/1977 | Germany . |
| 58-103624 | 6/1983 | Japan . |
| 4-296642 | 10/1992 | Japan . |

*Primary Examiner*—Stephone B. Allen
*Attorney, Agent, or Firm*—Arent, Fox, Kintner, Plotkin & Kahn

[57] ABSTRACT

A pixel density detector includes a cylinder (1) having a characteristic of catching incident light, an entrance window (2) provided in a shape of a slit in the longitudinal direction of the cylinder (1), and 2 pieces of light detecting device (4) disposed at a prescribed internal on the cylinder (1) at a prescribed angle against the entrance window (2).

2 Claims, 6 Drawing Sheets

INTEGRATING CYLINDRICAL PIXEL DENSITY DETECTOR

TECHNICAL FIELD

The present invention relates to a pixel density detector. To be more specific, it relates to a pixel density detector capable of detecting the density up to the limit of visibility of human eyes.

BACKGROUND ART

Various records of medical examination and consultation are daily produced in large volumes in medical organizations. Especially, an increase in the volume of medical pictures due to development and diffusion of image diagnostic equipment is posing a problem about how to preserve such medical pictures. Under such circumstances, the Ministry of Health and Welfare issued a circular notice to the effect that preservation of x-ray photograph, CT pictures, etc. may be made in the form of electronic media such as optical disc, magnetic disc, etc. in place of preservation of the original pictures.

With such changes in the medical environments, it is becoming necessary to accurately measure variable-density pictures of large surface area such as light transmission type X-ray photograph of chest for medical use, etc. up to the limit of visibility of human eyes and then decompose its density in pixels to store and reproduce it in numerical values.

By the way, methods and apparatuses for detecting the density of variable-density pictures currently known generally include the following:

The first method and apparatus is one which is designed to use, as light source, a uniform-plane light source "a" as shown in FIG. 5, condense the light from this light source "a" by a convex lens "b" after transmission through a film "f", and then detect the density by means of a plane CCD sensor "m". In FIG. 5, dotted lines indicate optical paths. The same is true with FIG. 6 to FIG. 10 that follow.

The second method and apparatus is one which is designed to use, as light source, a uniform-plane light source "a" as shown in FIG. 6, condense the light from this light source "a" by a cylindrical lens "c" after transmission through a film "f", and detect the density by means of a line CCD sensor "n".

The third method and apparatus is one which is designed to use, as light source, a line-scan light source "d" as shown in FIG. 7, condense the light from this light source "d" by a glass fiber bundle "g" after transmission through a film "f", and detect the density by means of a PIN photo diode "p". In FIG. 7, the arrow mark indicates the direction of scanning. The same is true with FIG. 8 to FIG. 10 that follow.

The fourth method and apparatus is one which is designed to use, as light source, a line-scan light source "d" as shown in FIG. 8, condense the light from this light source "d" on an integrating sphere "i" after transmission through a film "f", and detect the density by means of a PIN photo diode "p".

The fifth method and apparatus is one which is designed to use, as light source, a line-scan light source "d" as shown in FIG. 9, condense the light from this light source "d" by a glass fiber bundle "g" after transmission through a film "f", and detect the density by means of a PMT (photomultiplier tube) "t".

The sixth method and apparatus is one which is designed to use, as light source, a line-scan light source "d" as shown in FIG. 10, condense the light from this light source "d" on an integrating sphere "i" after transmission through a film "f", and detect the density by means of a PMT (photomultiplier tube) "t".

In addition to the above, there are also those which use LED or EL as light source.

However, said respective methods and apparatuses have the following problems:

For example, for digitizing an X-ray photograph of chest, a picture element resolution (positional resolution) of 4444× 5398 pixels is required, but no plane CCD sensor "m" used for such a large surface area is put into practical use at present because of a variety of problems. For that reason, the first method and apparatus causes a problem not to detect density on the object X-ray photograph of chest, etc.

Moreover, while, as line CCD sensor "n", those of 1024, 2048 and 4096 pixels are developed currently, their resolution is limited to approximately 256 ($2^8$) or so at best and, therefore, they have a problem of being unfit for use as detecting element for X-ray photograph of chest, etc. which is said to require a resolution of 10000 or so. For that reason, the second method and apparatus causes a problem not to detect of density on the object X-ray photograph of chest, etc. as the first one.

Furthermore, in the case where the light is condensed with the use of a glass fiber bundle "g", there is a possibility of detecting the density on the object X-ray photograph of chest, etc. by using the smallest glass fiber of 50 $\mu$m in diameter currently developed, because the positional resolution of the glass fiber bundle "g" depends on the glass fiber diameter. However, the operation of arranging glass fibers of a diameter of 50 $\mu$m at equal intervals on a row cannot be easily mechanized and therefore must be carried out by hand work, causing a problem of low productivity and high cost.

Still more, in the case of detection made by using an integrating sphere "i", it is necessary to provide a large number of integrating spheres "i" in parallel to improve the positional resolution because the positional resolution is determined by the size of focal point of the light source, causing a problem of large equipment size and, inevitably, of high equipment cost. An integrating sphere "i" is realized, as shown in FIG. 11, by providing an entrance window and a light detecting element such as photomultiplier tube, etc. on a sphere in such a way as to catch the incident light the entrance window by integrating it in the sphere and detect the quantity of light caught with the light detecting element.

DISCLOSURE OF THE INVENTION

Considering the problems accompanying the prior art, it is an object of the present invention to provide a pixel density detector capable of detecting the density at desired resolution while securing desired positional resolution, even in X-ray photograph of chest, etc. which is said to require a resolution of 10000 or so.

The pixel density detector according to the present invention is characterized in that it comprises a cylinder having a characteristic of catching incident light, an entrance window provided in the shape of a slit in the longitudinal direction of the cylinder, and 2 pieces of light detecting means disposed at prescribed interval on said cylinder at prescribed angle against the entrance window.

Here, said cylinder is an integrating cylinder and said light detecting means is a photomultiplier tube, for example.

The incident light entering into the cylinder through the entrance window is caught in the cylinder, and the quantity of light caught is detected immediately by the light detecting means. And this detected quantity of light is amplified as desired and recorded in the form of numerical value on a storing device such as computer, etc.

BEST MODE FOR CARRING OUT THE INVENTION

Hereinafter, the present invention is described on the basis of embodiments with reference to the drawings attached hereto, however, the scope of the present invention is not limited to the embodiments.

Figure 1:
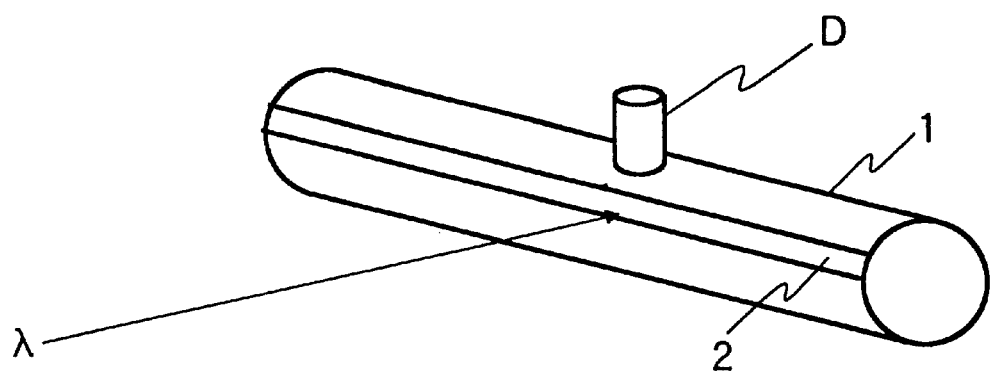
FIG. 1 is an explanatory illustration showing the principle of the pixel density detector according to the present invention.

FIG. 1 shows the principle of detection of the detector A used for the pixel density detector according to the present invention.

Figure 3:
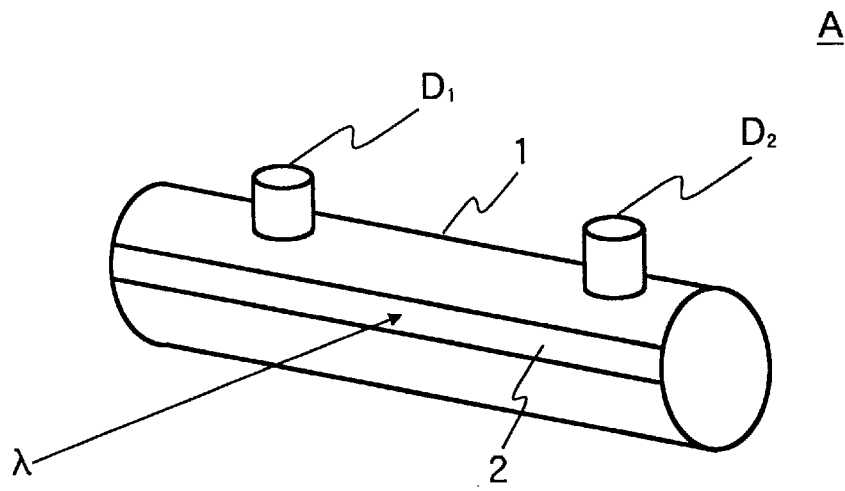
FIG. 3 is a schematic diagram of the pixel density detector under the embodiment of the present invention.

The principle of this detector A consists in expanding the principle of detection of quantity of light by integrating sphere to function as a line sensor. Namely, this detector A is realized by furnishing the cylinder 1 with characteristics of integrating sphere, providing an entrance window 2 in the shape of a slit in it, and providing a light detecting sensor D such as PMT, for example, at right angle against the entrance window at a proper position such as the central part, for example. The cylinder 1 of such construction is referred to as "integrating cylinder" in this Specification. Moreover, in FIG. 1, the entrance window 2 is exaggerated for the convenience of drawing. The same is true also with FIG. 3.

Figure 2:
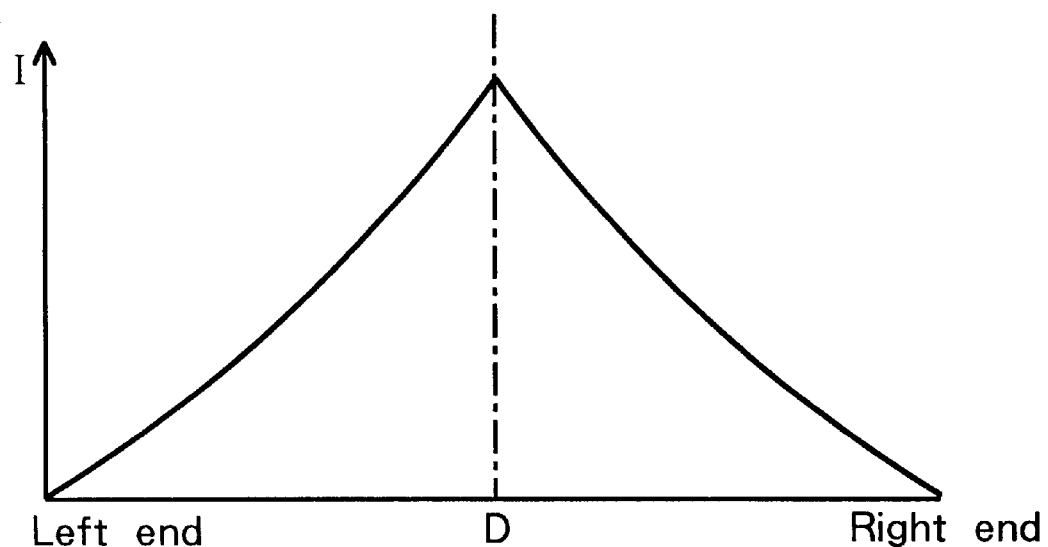
FIG. 2 is a graph showing the relation between the quantity of light by that detector and the alienation ratio from the detecting sensor.

Thus, about the incident light entering into the detector A of such construction, the light energy in the direction perpendicular to the axis of cylinder of the incident light is diffused in the direction of infinite length, if the length of the cylinder 1 is infinite. For that reason, the relative quantity of light I entering into a detector A as shown in FIG. 1 forms a sharp angle curve with the position of the detecting sensor D at the peak, as shown in FIG. 2. This angle curve is given with the following approximate expression:

$$I = k(1/r^2)i_0$$

where,
k: Proportional constant
r: Alienation ratio against detecting sensor in the direction of axis of cylinder (Clearance)
$i_0$: Intensity of incident light However, because the length of the cylinder 1 is limited in reality, the quantity of light ratio of the incident light at the end of the cylinder 1 to the incident light at the center (position where the detecting sensor D is provided) lend/lctr comes to approximately 1/10 or under.

Figure 4:
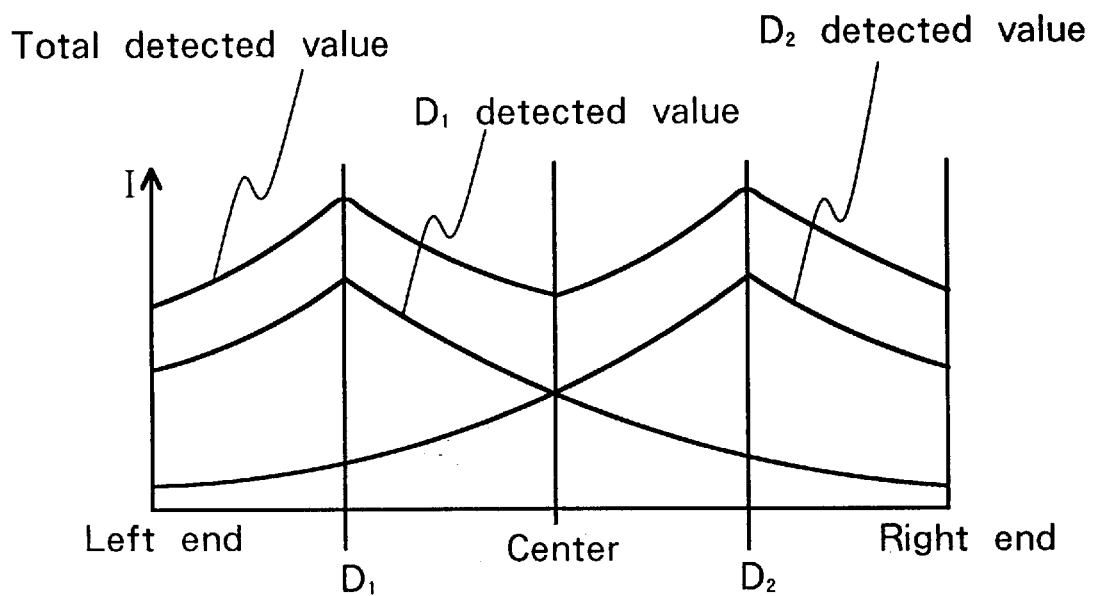
FIG. 4 is a graph showing the relation between the quantity of light by that detector and the alienation ratio from the detecting sensor.
Figure 5:
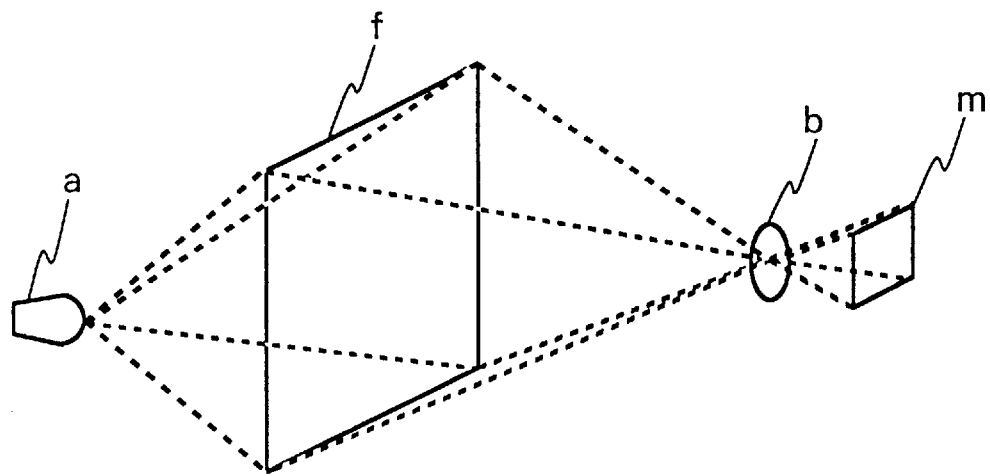
FIG. 5 is a schematic diagram of a density detector by the first method of the prior art.
Figure 6:
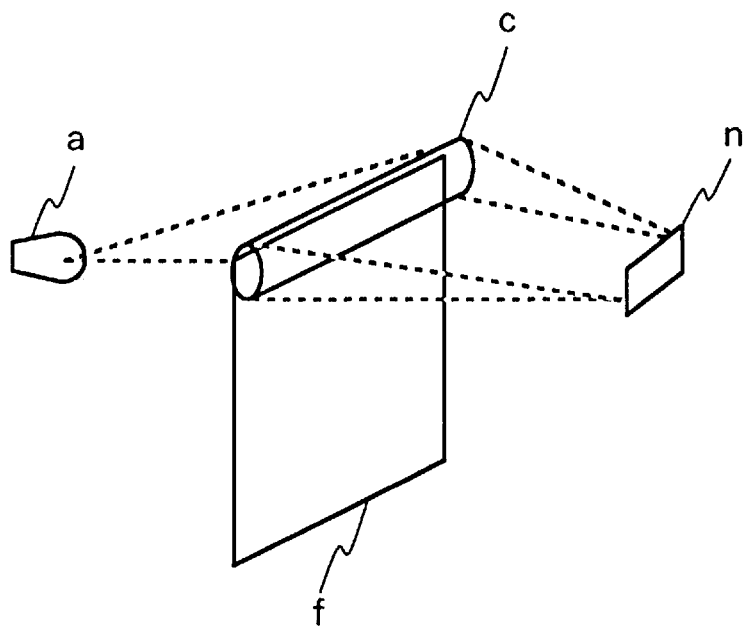
FIG. 6 is a schematic diagram of a density detector by the second method of the prior art.
Figure 7:
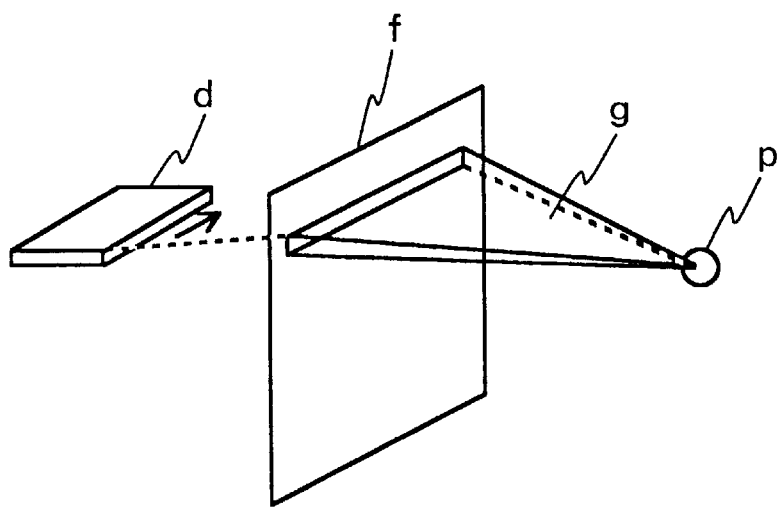
FIG. 7 is a schematic diagram of a density detector by the third method of the prior art.
Figure 8:
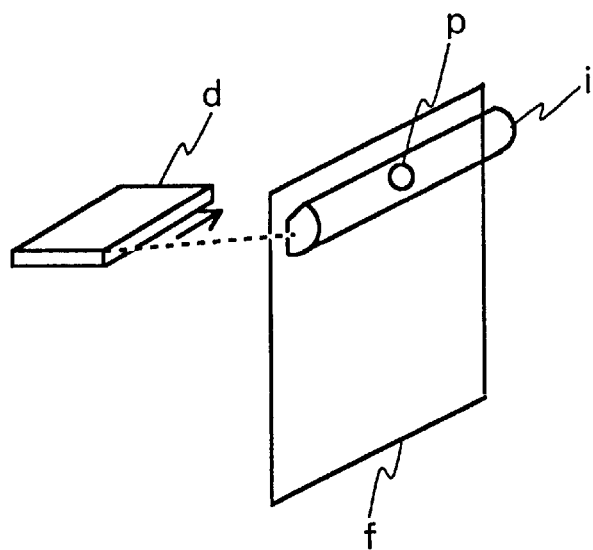
FIG. 8 is a schematic diagram of a density detector by the fourth method of the prior art.
Figure 9:
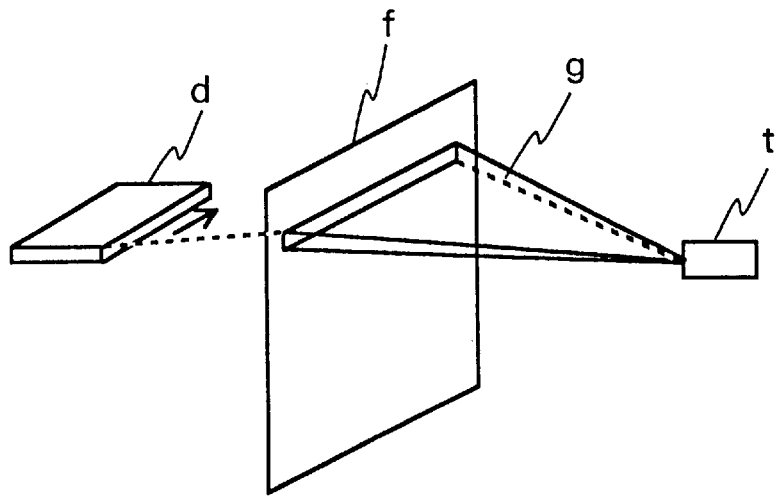
FIG. 9 is a schematic diagram of a density detector by the fifth method of the prior art.
Figure 10:
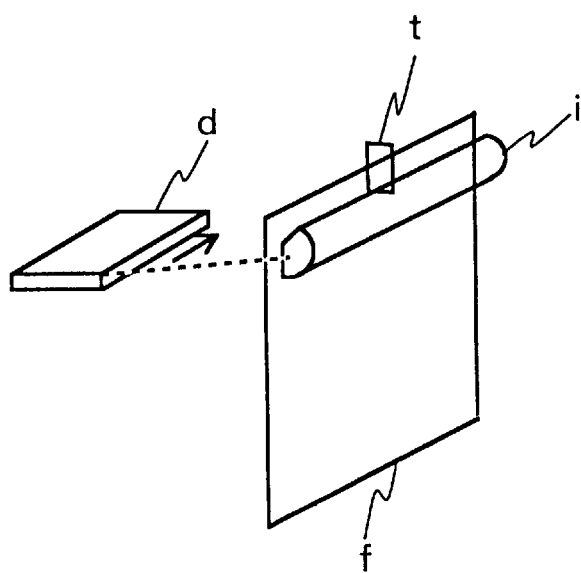
FIG. 10 is a schematic diagram of a density detector by the sixth method of the prior art.
Figure 11:
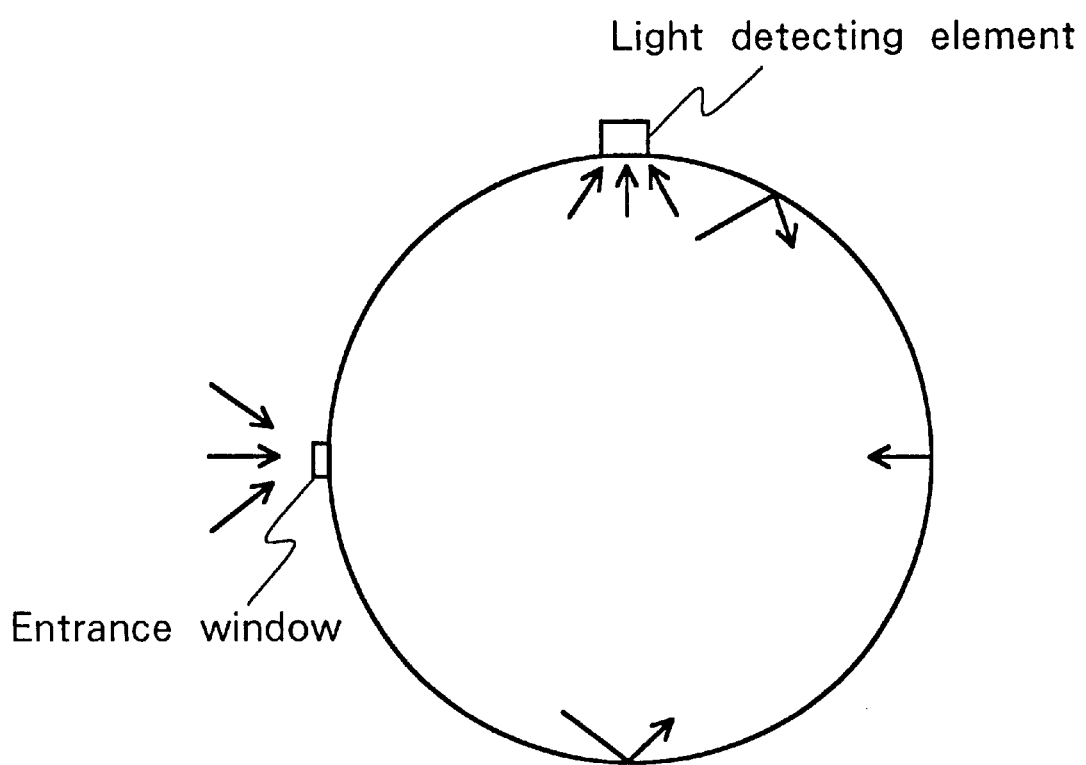
FIG. 11 is an explanatory illustration showing the principle of an integrating sphere.

To reduce for smoothing such value of detected quantity of light ratio at the center and the end part, this mode of embodiment uses 2 pcs. of detecting sensor D such as PMT, etc. and $D_1$, $D_2$ are provided respectively at proper position for, example, at the position of ¼ from the respective end parts, at right angle against the entrance window 2. By constructing the detector A this way, it becomes possible to smooth the quantity of light at respective parts as shown in FIG. 4 and catch, i.e. detect 65 to 70% of the incident light. Moreover, the quantity of light which entered into the integrating cylinder 1 is detected immediately by the detecting sensors $D_1$, $D_2$. And this detected quantity of light is amplified as desired and recorded in the form of numerical value on a storing device such as computer, etc.

Further smoothing may be expected theoretically by providing no less than 3 detecting sensors D, but it is undesirable to have 3 or more detecting sensors D because it not only becomes costly but also makes the difficult of production.

INDUSTRIAL APPLICABILITY

As described above, the pixel density detector according to the present invention achieves an excellent effect of detecting the density at desired resolution while securing desired positional resolution, even in large variable-density picture such as X-ray photograph of chest, etc. which is said to require a resolution of 10000 or so. It also achieves an excellent effect of realizing super high-speed response because the quantity of light which entered into the pixel density detector is detected immediately by detecting sensor.

In this way, the pixel density detector according to the present invention achieves excellent effects and can therefore be applied to the face density detector of an image processing system, etc.

We claim:

1. A pixel density detector comprising:
   a cylinder having a characteristic of catching incident light,
   an entrance window provided in a shape of a slit in a longitudinal direction of the cylinder, and
   two light detecting means disposed at ¼ of a length from a respective end on said cylinder at right angles to the entrance window.

2. A pixel density detector as defined in claim 1, wherein said cylinder is an integrating cylinder and said light detecting means is a photomultiplier tube.

* * * * *